March 3, 1970 J. D. MATTEO 3,498,697
REARVIEW MIRROR FOR VEHICLES
Filed Feb. 24, 1966 4 Sheets-Sheet 1

INVENTOR
John D. MATTEO

INVENTOR
John D. MATTEO

United States Patent Office 3,498,697
Patented Mar. 3, 1970

3,498,697
REARVIEW MIRROR FOR VEHICLES
John D. Matteo, Box 53, Harleigh, Pa. 18225
Filed Feb. 24, 1966, Ser. No. 529,719
Int. Cl. G02b 5/08, 7/18
U.S. Cl. 350—302                              6 Claims

ABSTRACT OF THE DISCLOSURE

A rearview mirror arrangement is provided inside the roof of a car, or like vehicle, utilizing a plurality of mirrors for observation through a transparent window at the rear of the vehicle, wherein the mirrors are contained within a closed box.

---

This invention relates to a rearview mirror for vehicles, particularly passenger vehicles, but also vehicles having box-shapes such as delivery vans, and also for trucks.

The rearview mirrors heretofore customarily positioned inside the vehicle have the important disadvantage that they have a large blind angle limited by the lateral boundaries of the back window. This blind angle includes such motor vehicles as are about to pass or have already begun to pass, and also such vehicles as have just completed overtaking.

At least a partial elimination of this serious shortcoming is achieved by employing an outside rearview mirror on the driver's side of the motor vehicle. This, however, has the disadvantage that it is easily soiled or covered with snow and also frequently knocked out of position by people passing by, by playing children and also upon parking in relatively narrow garage spaces, all making its correct rear adjustment relatively inconvenient. Moreover, when using such an outside rearview mirror, even when one is provided on each side of the vehicle, the blind angle is nevertheless not completely eliminated.

The inside mirrors heretofore customary have experienced the further disadvantage that children and also grown passengers like to readjust them, and if this happens at the time the driver wishes to use the rearview mirror, this can lead to disagreeable traffic situations and even accidents.

It is an object of this invention to provide a rearview mirror which overcomes all of the disadvantages referred to above, with respect to the existing inside and outside rearview mirrors, and especially to provide one which contributes a very wide angle of view toward the rear and at the same time also laterally and behind the vehicle.

This problem is solved in accordance with this invention by providing a mirror which extends long the inside of the forward end of the roof which is inclined forwardly from the top toward the bottom, which may be curved concavely over the entire width of the top or may be arranged in the form of a multiplicity of flat pieces arranged approximately along a concave line, such mirror being combined with a transparent window in the form of an uncovered slit located above the rear window and extending down from the rear end of the top; the image is reflected by the aforementioned mirror and forwarded to a second mirror which is arranged toward the front and positioned somewhat under and behind the first mentioned mirror, and is of approximately similar width, and a third mirror, again inclined downwardly forwardly, likewise the same width as the first mirror whereby the inclination of at least one of the two last mentioned mirrors is adjustable to reflect the image to the eye of the driver.

With this rearview mirror construction a very large viewing angle is provided toward the rear, which is much larger than that of a similar inside mirror and also still larger than the similar image angle of an inside and one or two outside rearview mirrors. The danger of an unclear image arising through water or snow deposited on an outside rearview mirror is completely overcome by the provision of the rearview mirror construction, also the danger of an undesired adjustment of the same by a traveling companion. Further, the hindrance of visibility by the use of an inside rearview mirror because of companions traveling in the rear seat is overcome. Also the depth of field of the street section which is comprehendable by the use of the rearview mirror is amplified.

The rearview mirror according to this invention is particularly valuable as original equipment for new motor vehicles, but can also be installed as a unit in existing motor vehicles without excessive rebuilding.

The adjustment of inclination of at least two or three mirrors serves in the customary way as the original adjustment for the accommodation of the size of the particular driver.

A particularly preferable view through the rearview mirror is provided if, in accordance with this invention an underdeck is provided underneath the top, substantially parallel thereto, which together with the top and the upper parts of the adjacent side walls forms a closed box, encloses the light rays between the rear slit and the upper, first mentioned mirror. In order to close this box completely and to isolate it from the passenger space of the motor vehicle, so that no dust or humidity can penetrate into the inside of the box, it is expedient according to this invention to provide a transparent window, made for example out of glass or a transparent synthetic material, extending between the under edge of the second, middle mirror and a location rearwardly of the under edge of the third mirror, such transparent window extending toward the rear, through which the driver can observe the lowermost, third mirror. In order to prevent accumulation of water of condensation, in accordance with this invention separate heat insulating layers can be provided on the inner surfaces of the box. Moreover, in a similar way, the space within the box can be provided with a piece or a layer of hygroscopic material. Also, heat insulating layers can be provided which are themselves hygroscopic or which are treated with hygroscopic materials.

It is possible still further to enlarge the observable viewing angle through the rearview mirror toward the rear, and thereby to reduce still further the blind angle to the point of virtually eliminating it, by lengthening further the slot in the back wall of the vehicle and extending it along the two separate side walls in accordance with this invention.

The adjustable nature of the inclination of at least one of the two lower mirrors can be achieved in a very simple manner such that the mirror in question is swivel-mounted about its upper or lower edge and so that it can be rotated by means of one or more springs arranged against at least one adjustable stop, preferably a screw. A simple turning of this screw suffices for the adjustment of the mirror in both directions. This means at least eliminates the danger that a passenger sitting near the driver, as is often to be observed, will make a significant adjustment of the inside rearview mirror, in order to turn it to view himself for cosmetic purposes, although in many vehicles a special mirror is provided on the inside of the sun visor in front of the passenger's seat for this purpose, or is at least available on the market.

The drawings show, somewhat schematically, a specific example of the invention as applied to a passenger motor vehicle.

In all the figures of the drawings, similar parts are represented by the same reference numbers.

The roof of the passenger motor vehicle is designated 1, its windshield 2, its rear window 3, and both side walls 4, 5. The parts of the motor vehicle which are located below these parts have not been provided with reference numbers since they are not pertinent to an understanding of the invention, and they are therefore also not described.

Figure 1:
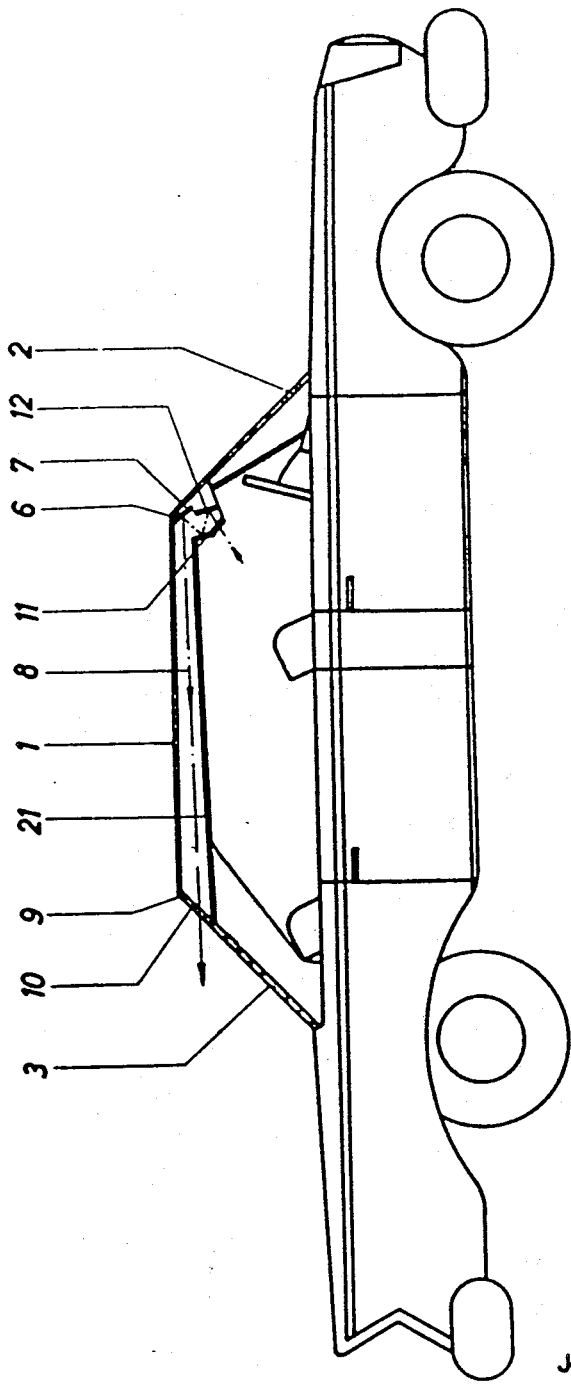
FIG. 1 shows a passenger motor vehicle provided with a rearview mirror in accordance with this invention, the lower part beneath the belt line being shown in side elevation, and above this line, through the upper body and the roof, being shown in vertical section taken along the line 1—1 which appears in FIG. 4.
Figure 2:
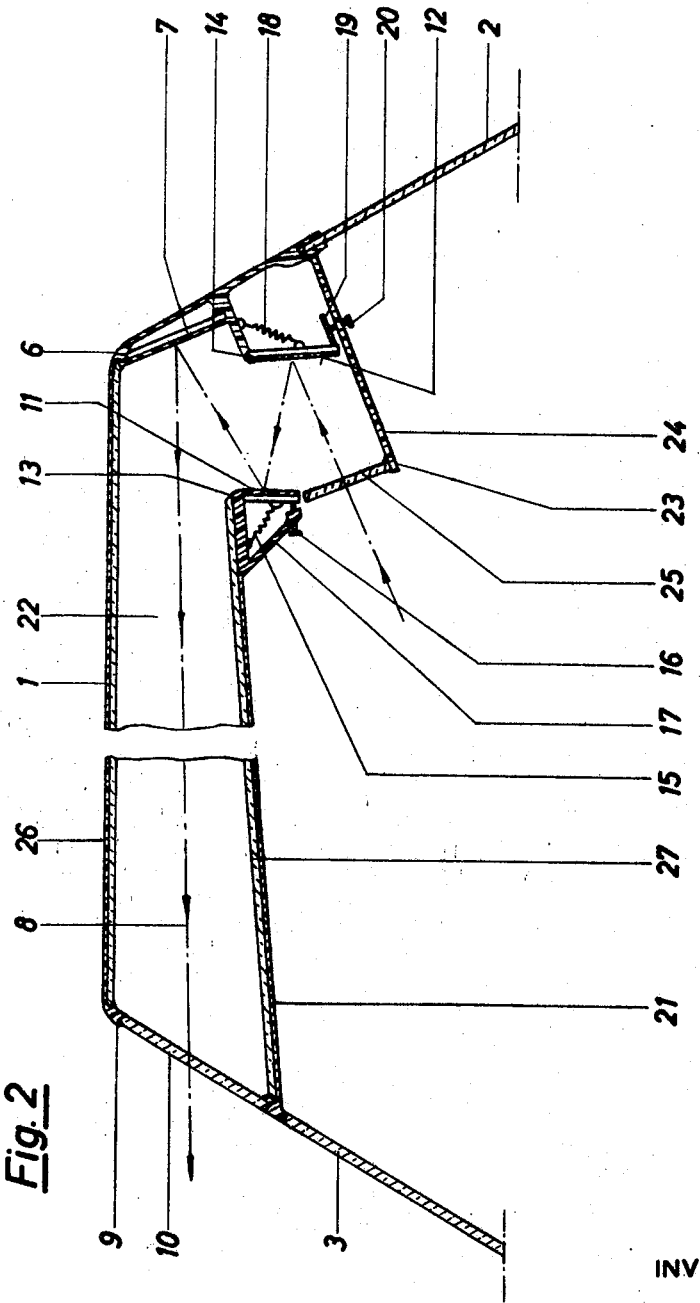
FIG. 2 shows, likewise in vertical sectional view in accordance with the section line 1—1 which appears in FIG. 4 through the upper part and the roof of the motor vehicle, an enlarged representation of the particulars of the rearview mirror in accordance with this invention.
Figure 4:
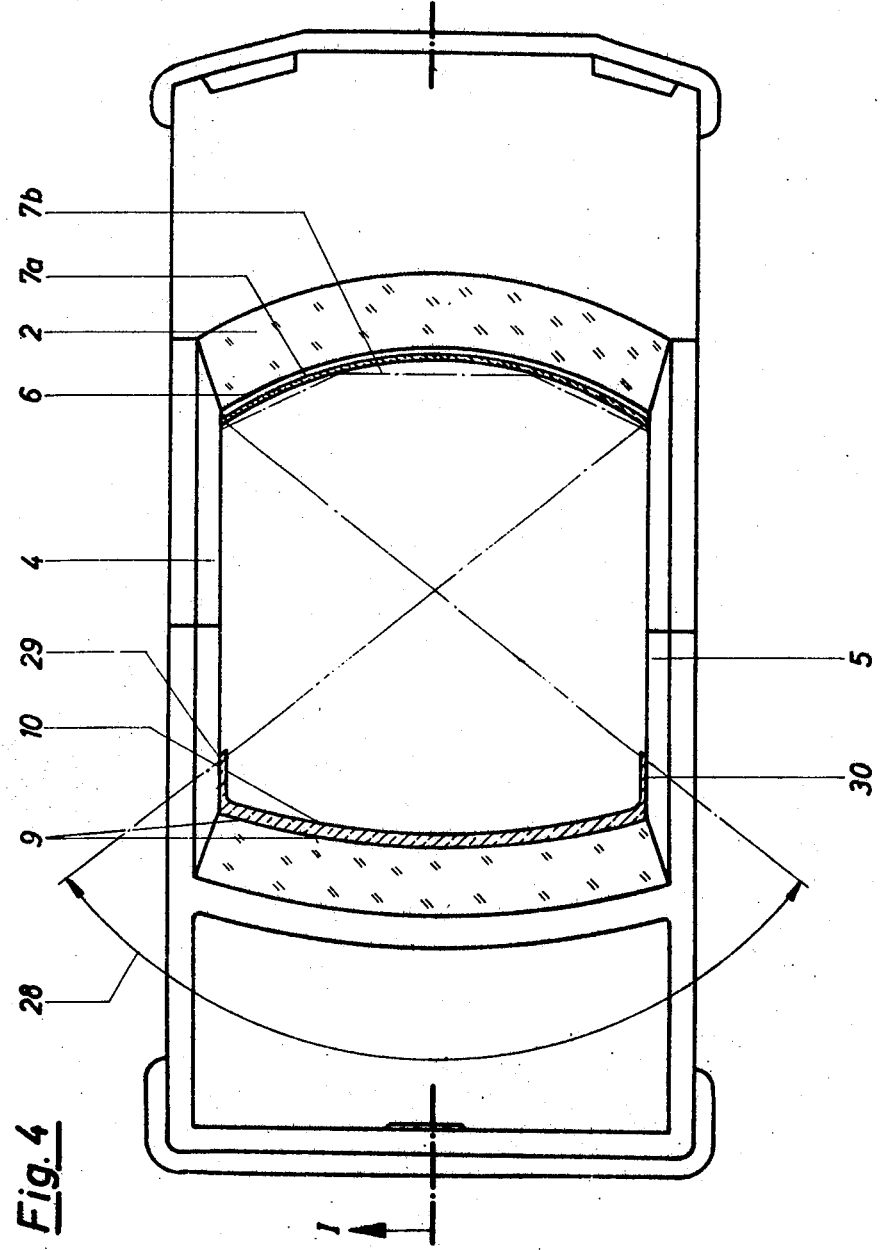
FIG. 4 shows in plan, in which the top of the vehicle is considered as cut away, of the upper mirror of the rearview mirror construction, and of the attainable observation angle toward the rear.

Along the inside of the front end 6 of the top 1 is a mirror 7 which is inclined toward the front from the top toward the bottom, which extends usefully across the entire width of the top 1. As FIG. 4 shows, mirror 7 can either be concavely curved throughout as is shown by a thick continuous line 7a, or can be composed of a multiplicity of flat pieces arranged together, with substantially similar operation, as an approximation of a convex line according to the line 7a; this is pointed out in FIG. 4 by means of the dot-dash line 7b. In FIGS. 1 and 2, represented by means of dot-dash lines with arrows, is the image path 8 that extends between this mirror 7 and a slot 9 which extends down from the rear end of the roof 1 to the top of the rear window 3, and is enclosed by means of a transparent window 10 which is, for example, composed of glass or a transparent synthetic material. The mirror 7 projects the image that it has received to a second mirror 11 which is arranged toward the front and somewhat under and behind the first mirror 7, and having a breadth approximately the same as that of the mirror 7, and then to a third mirror 12 which again, like the mirror 7, is inclined downwardly toward the front, which similarly has the same breadth as the first mirror 7, and reflects toward the eye of the driver. As shown, the second mirror 11 is mounted on bearings at its upper edge 13 and the third mirror 12 is adjustable about its upper edge 14 by means of a suitable hinge, linkage or the like, so that by such adjustment a change of its inclination and therewith a change of the image path 8 is obtained. The mirror 11 may be turned by means of one or more springs 15 operating against adjustable stops in the form of screws 16, which are screwed into the stationary body part 17, so that it is possible by turning the screw 16 to adjust the mirror 11 in both directions as desired. The mirror 12 can similarly be turned by means of a tension spring 18, operative against an adjustable stop, which in this case however is in the form of an eccentric disc 19, which can be turned from outside by means of a hand knob 20.

In accordance with the illustrated example, a lower deck 21 is provided, substantially parallel or slightly downwardly angled toward the rear, which together with the roof 1 and the upper parts of both separate side walls 4 and 5 forms a closed box, which completely encloses the image path 8 between the rear slot 9 and the upper, first mentioned mirror 7. In this manner the image path from the slit 9 is completely isolated from outside influences, for example from illumination in the passenger space of the vehicle or light which comes in through the windshield. Also, any hindrance or partial interference with this image path because of passengers on the back seat is thereby eliminated. Between the under edge of the second mirror 11 and the somewhat lower line under edge 23, toward which a plate 24 extends rearwardly from the under edge of the third mirror 12, as FIG. 2 most clearly shows, a window 25, of transparent material for example of glass or a transparent synthetic material, is provided, which closes off the interior space 22 of the box from the passenger space of the motor vehicle, so that no dust, moisture or the like can be transmitted from the passenger space to the interior space in the box. The window 25 is located between the eye of the driver and the lowest mirror 12; the image path 8 travels rearwardly through this window.

In order to minimize as much as possible the accumulation of water of condensation in the interior space 22 of the box, or to keep it to a minimum, the inner surfaces of the box are provided with heat insulating layers 26, 27. In this box also a piece or a bed of hygroscopic material can be provided, which is not specifically represented. Obviously it is also possible to make the heat insulating plates 26, 27 themselves out of a hygroscopic material or out of a heat insulating material to which a hygroscopic material is applied.

Figure 3:
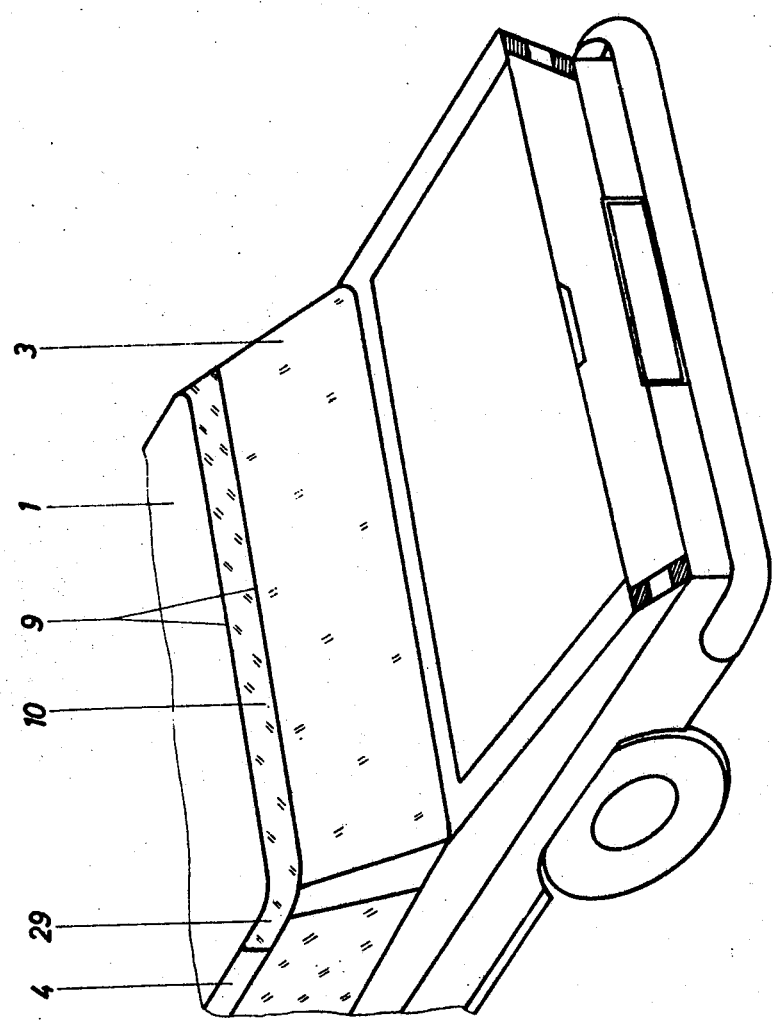
FIG. 3 shows in perspective the appearance of a motor vehicle provided with the rearview mirror in accordance with this invention.

As FIG. 4 indicates, the rear view mirror in accordance with this invention has a very large angle of view toward the rear, which is designated with the number 28, and a correspondingly small blind angle. FIGS. 3 and 4 show that in accordance with the example illustrated, for the further enlargement of this angle of view the slit in the back wall of the motor vehicle is lengthened in both of the separate side walls 4 and 5, toward the front; these parts in the side walls 4 and 5 are designated with the numbers 29 and 30.

The window 10 in slit 9 can also, if desired for the purpose of improving the optical characteristics, be made as a lens of the desired kind. The mirrors 7, 11 and 12 can in any desired manner, for example, be characterized by a curved formation for the purpose of improving their optical characteristics. The selection of these particular forms is governed at any given time by the volumetric proportions of a particular motor vehicle which is to be fitted out with the rear view mirror according to this invention.

The following is claimed:

1. A rearview mirror apparatus for a vehicle having a body and a top, comprising a mirror which extends along the inside of the forward end of the top, such mirror being inclined forwardly from the top toward the bottom, a transparent window at the rear of the body located above the rear window and extending down from the rear end of the top of the vehicle, a second mirror arranged in the vicinity of the front of the vehicle and positioned somewhat lower than and to the rear of the first mentioned mirror, and it being of approximately similar width, and a third mirror also inclined downwardly and of approximately the same width as the first mirror, and arranged to reflect to the eye of the driver the image passing through said rearwardly located transparent window and reflected from the first and second mentioned mirrors, wherein all said mirrors are curved concavely between opposite sides of the vehicle through substantially the entire width of the upper portion of the vehicle, wherein a lower deck is provided substantially parallel to the top, which together with the top and the upper parts of the side walls of the vehicle forms a closed box which encloses the image path running from the transparent window to the upper, first mentioned mirror.

2. The rearview mirror defined in claim 1, wherein at least one of said mirrors is adjustably inclined, and wherein means are provided for adjusting the amount of such inclination.

3. The rearview mirror defined in claim 2, wherein at least two of said mirrors are adjustable, and wherein said adjusting means comprises means for adjusting the mirrors independently of one another.

4. The rearview mirror in accordance with claim 1, wherein a rearwardly inclined plate is provided below the under edge of the third mentioned mirror back to a location somewhat below the under edge of the second mentioned mirror, and wherein a window of transparent material extends upwardly from the rear edge of said plate toward the under edge of said second mirror.

5. The rearview mirror in accordance with claim 1, wherein the inner surface of the box is provided with heat insulation linings.

6. The rearview mirror in accordance with claim 1 characterized by the fact that a hygroscopic material is provided as lining material adjacent surfaces in the inner space of said box.

References Cited

UNITED STATES PATENTS

| | | | |
|---|---|---|---|
| 1,617,270 | 2/1927 | Paul | 350—302 |
| 1,687,572 | 10/1928 | La Hodny | 350—307 |
| 2,467,266 | 4/1949 | Lumsden | 350—302 |
| 2,942,522 | 6/1960 | Merriam | 350—302 |
| 2,963,942 | 12/1960 | De Montremy | 350—66 |

FOREIGN PATENTS 924,721   5/1963   Great Britain.

DAVID SCHONBERG, Primary Examiner

MICHAEL J. TOKAR, Assistant Examiner